(No Model.)
G. SCHELER.
TOY ANIMAL.
No. 450,195. Patented Apr. 14, 1891.
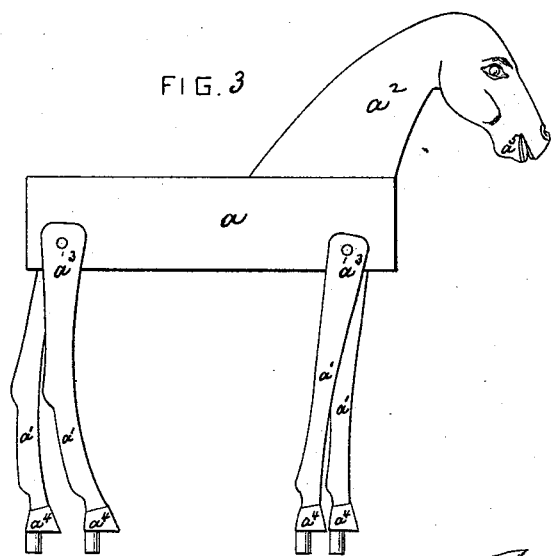
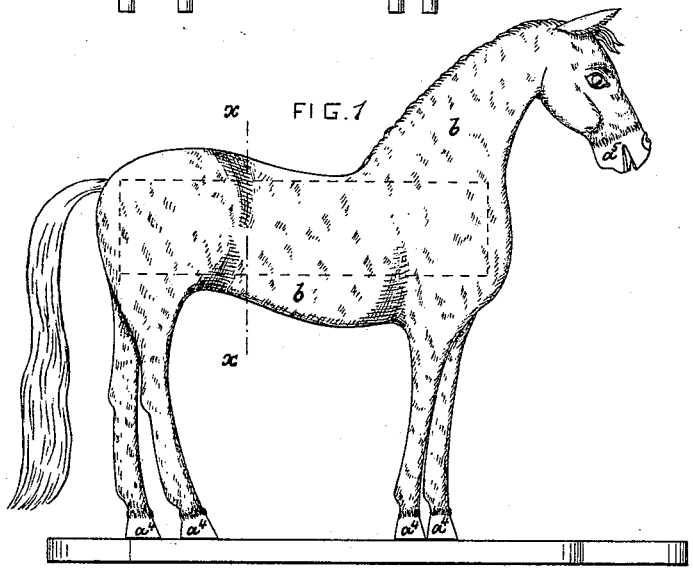
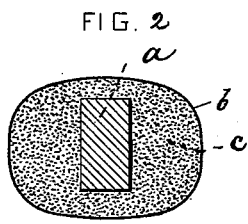
WITNESSES.
Wm. H. Lowe
A. Jonghmans
INVENTOR
G. Scheler
by his attorneys
Roeder & Briesen

UNITED STATES PATENT OFFICE.

GEORG SCHELER, OF NEW YORK, N. Y.

TOY ANIMAL.

SPECIFICATION forming part of Letters Patent No. 450,195, dated April 14, 1891.

Application filed January 10, 1891. Serial No. 377,329. (No model.)

*To all whom it may concern:*

Be it known that I, GEORG SCHELER, of New York city, New York, have invented an Improved Toy Animal, of which the following is a specification.

This invention relates to a toy animal of simple construction and great strength, and which may be made to closely resemble a living animal.

It consists in the various features of improvement more fully pointed out in the claim.

In the accompanying drawings, Figure 1 is a side elevation of my improved toy animal. Fig. 2 is a cross-section on line $x$ $x$, Fig. 1; and Fig. 3 is a side elevation of the core.

My improved toy animal consists, essentially, of three parts—viz., a central core, a stuffing around the core, and a skin around the stuffing. The core is approximately of the form of the animal to be produced, but it is considerably smaller. Thus $a$ is the body of the core, to which the legs $a'$ and the neck $a^2$ are connected. The legs $a'$ are secured to the block $a$ by pivots or pins $a^3$, while the neck is glued or nailed to the block.

The skin $b$ of the animal consists of a longitudinal right half and a longitudinal left half, which are sewed together along all the edges, excepting at the top, so as to form a bag with four legs. Into this bag the core is placed, with the hoops or feet $a^4$ and mouth $a^5$ projecting out of the skin. Next a stuffing $c$, of sawdust or similar material, is packed into the skin around the core, and by a little practice the rounded contour of the body may be readily produced. After the stuffing operation is completed the skin is sewed together along the back, when the toy animal will be completed. By causing the core to project out of the skin at the mouth and the feet these parts are produced in a simple and life-like manner. The core not only greatly strengthens the structure, but it constitutes a foundation for the proper and even distribution of the stuffing.

By pivoting the legs $a'$ to the core $a$ a life-like position may be readily given to the animal before the legs are secured to the base-plate.

What I claim is—

A toy animal consisting of a central core $a$, legs $a'$, pivotally connected thereto, a stuffing around the core, and an outer skin, substantially as specified.

GEORG SCHELER.

Witnesses:
F. V. BRIESEN,
A. JONGHMANS.